Patented Oct. 10, 1939

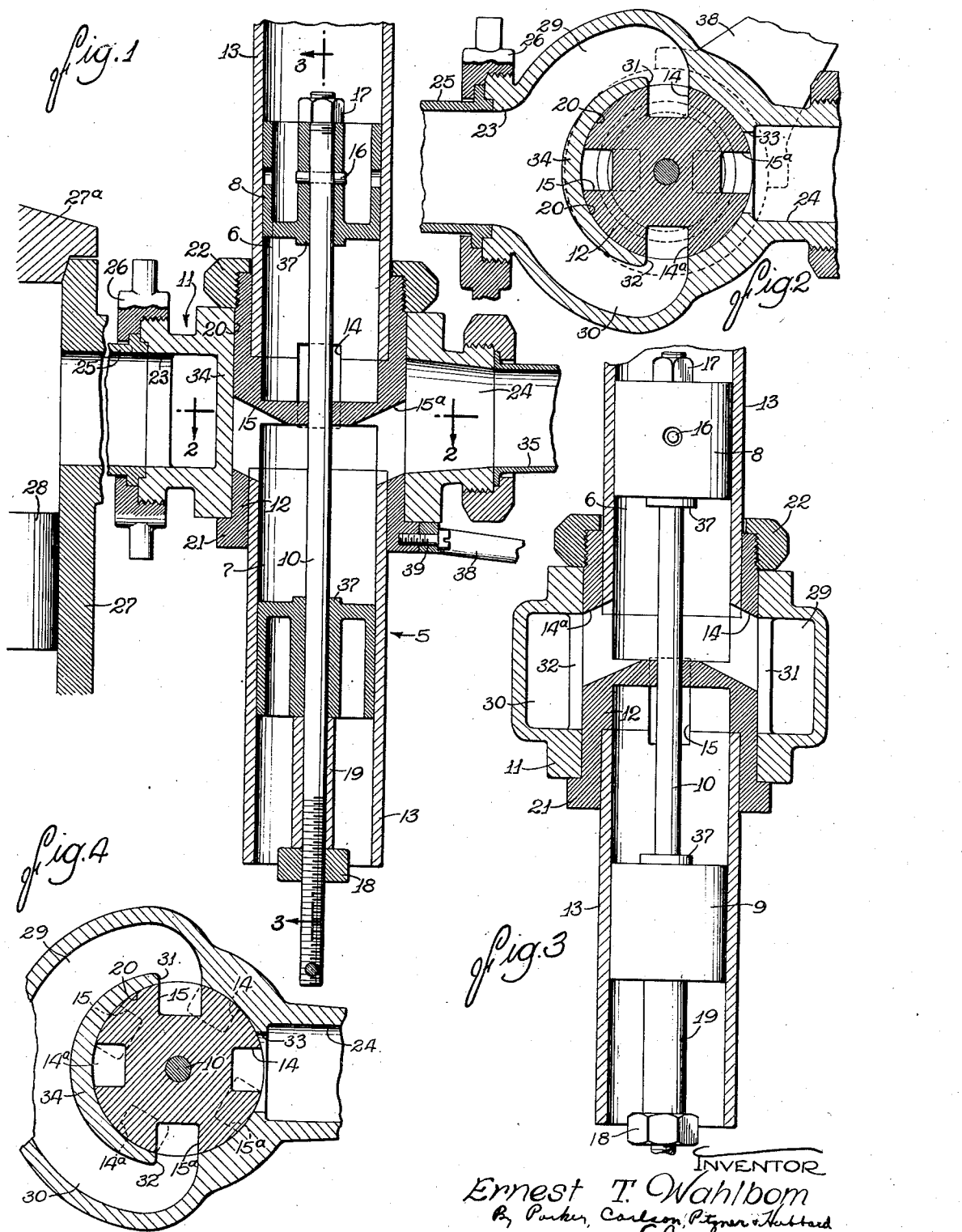

2,175,234

UNITED STATES PATENT OFFICE 2,175,234

MEASURING DEVICE

Ernest T. Wahlbom, Rockford, Ill.

Application August 19, 1937, Serial No. 159,855

8 Claims. (Cl. 221—103)

The invention relates generally to apparatus for measuring plastic materials, and more particularly to a device for dispensing such material in accurately measured portions of predetermined weight or quantity.

One object of the invention is to provide a device of the above general character which is capable of apportioning the material with a high degree of accuracy and which may be readily adjusted to deliver the material in portions of any desired size within the capacity of the device.

Another object is to provide a device for measuring plastic materials under relatively high pressure which can be actuated with a minimum of effort on the part of the operator, thereby adapting the device for high speed operation.

A further object is to simplify the construction of the measuring device to facilitate disassembly of the parts for cleaning or other purposes.

Other objects and advantages of the invention will become apparent from the following detailed description of the preferred embodiment illustrated in the accompanying drawing, in which:

Figure 1 is a longitudinal sectional view of a measuring device embodying the features of the invention.

Fig. 2 is a transverse sectional view of the device taken along the line 2—2 of Fig. 1.

Fig. 3 is a longitudinal sectional view of the device taken along the line 3—3 of Fig. 1.

Fig. 4 is a transverse sectional view taken along the same line as Fig. 2, but with the parts disposed in relatively different positions.

The preferred form of the measuring device selected to illustrate the invention is particularly suitable for measuring out quantities of sausage meat to be filled into sausage casings or other containers, and will be described hereinafter as employed for this purpose. It will be appreciated, however, that the device may be used for measuring and dispensing numerous other plastic materials which can be caused to flow under pressure. It is also to be understood that various changes and modifications in the construction and arrangement of the several parts of the device may be made by those skilled in the art without departing from the spirit and scope of the invention as defined by the appended claims.

Generally stated, the improved measuring device comprises a unitary casing structure 5 providing two measuring chambers 6 and 7 of equal capacity. The measuring chambers each have one end wall arranged for limited movement to determine the ultimate capacity of the chamber. In the present instance, these chambers are of cylindrical shape and the movable walls are formed by pistons 8 and 9 reciprocable within the respective chambers. The pistons are mechanically connected, as by an axially disposed piston rod 10, for movement as a unit and the plastic material is introduced into adjacent ends of the chambers so that, when one chamber is being filled, its piston moves in a direction to increase the capacity of the chamber while the other piston moves in a direction to expel the material from the other cylinder.

The casing structure is carried by a supporting member generally designated by the reference character 11 which, in the present instance, also forms a part of the valve mechanism for controlling the flow of material to and from the measuring chambers. The other part of the valve mechanism is incorporated in the casing structure itself, thereby materially simplifying the construction of the device and facilitating its accurate operation. To this end, the casing structure and supporting member are arranged for relative movement whereby the chambers 6 and 7 are alternately connected to a source of plastic material under pressure and to a discharge outlet through which the material may be discharged into suitable containers. Relative movements of the parts may be effected in any desired manner.

Means is also provided for varying the spacing of the pistons 8 and 9 relative to each other, whereby the capacities of the measuring chambers may be conveniently adjusted. Since the capacity of each chamber is determined by the length of the piston stroke, the adjustment provided in the present instance insures that these chambers will always be of exactly equal capacity.

As herein shown, the casing structure 5 comprises an intermediate section 12 of generally cylindrical form having outwardly facing cylindrical recesses at opposite ends. Fitted into each recess is a tubular member 13 open at one end which with the section 13 and the pistons 8 and 9 define the measuring chambers 6 and 7.

Means is provided for introducing the material to be measured and for discharging measured quantities of the material from adjacent ends of the chambers. To this end, the casing section 13 is formed with suitable passages communicating with the chambers and adapted to cooperate with inlet and outlet ports formed in the supporting member 12, as will appear presently. As herein shown, two passages are provided for each chamber, the passages 14 and 14ª communicating with the chamber 6, and passages 15 and 15ᵃ communicating with the chamber 7. The passages of each pair are arranged on opposite sides of the casing section, each pair being located in a plane at right angles to the plane of the other pair.

The pistons 8 and 9 are disposed within the chambers so that the material introduced into a chamber under pressure is effective to move the piston toward the open end of the tubular member 13. Such movement is limited by the relative spacing of the pistons from each other. In order to permit variation of this spacing, one of the pistons, in this instance the piston 9, is adjustably secured to the piston rod 10, while the piston 8 may be rigidly secured thereto as by a pin 16 and nut 17 threaded onto the end of the rod. The piston 9 is held against longitudinal movement relative to the rod 10 by means of a nut 18 threaded onto the rod. Thus, by simply turning the nut 18, the piston 9 may be moved toward or from the piston 8 to vary the capacity of both measuring chambers simultaneously. To facilitate adjustment, a spacing sleeve 19 is interposed between the nut 18 and the end of the piston so that the nut may be conveniently reached when the pistons have executed a part of their normal stroke. Due to the substantial spacing of the adjusting nut 18 from the piston 37, the threading of the piston rod 10 for the reception of the nut can be confined to the portion of the rod projecting beyond the cylinder which is never brought into contact with the meat in the measuring chamber. This materially facilitates the cleaning of the apparatus and avoids leakage of meat by spiraling through the threads which would otherwise occur in certain adjustments of the apparatus.

In the present instance, the casing structure is arranged to be supported for rotation about its axis relative to the supporting member 11. For this purpose, the supporting member is provided with a cylindrical opening or bore 20 adapted to receive the intermediate section 12 of the casing structure. The parts when assembled in this manner are held together by a flange 21 formed on one end of the casing section and a nut 22 threaded on the end of the section, the flange and nut engaging opposite sides of the member.

Formed within the supporting member is an inlet passage 23 and a discharge passage 24, both of which extend substantially at right angles to the axis of the casing structure. The inlet end of the member is adapted to be connected with suitable means for supplying plastic material thereto under pressure. In the particular embodiment herein shown, the member is removably connected with a pipe 25 which constitutes the discharge opening of a sausage stuffing machine of the usual construction. To facilitate the assembly of the measuring device with the machine, the connection may be conveniently made by means of a union 26 threading onto the member 11 and coacting with an annular flange on the end of the pipe 25. The machine comprises a cylindrical tank 27 closed by a cover 27ᵃ and provided with a piston 28. Sausage meat is received in the tank above the piston and, when the piston is forced upwardly, the meat is expelled through the discharge pipe 25 and into the inlet passage 23 of the supporting member 11.

As will be seen by reference to Fig. 2, the inlet passage 23 divides into two branches 29 and 30 which extend substantially half way around the opening 20 and terminate respectively in ports 31 and 32 on opposite sides of the opening. It will be apparent that when the casing structure is positioned to bring a pair of the passages 14—14ᵃ or 15—15ᵃ into registration with the ports 31 and 32, the material to be measured will flow into both sides of the chamber so as to exert a substantially uniform pressure on the walls of the chamber. Thus there is no tendency for the casing structure to tilt and bind on the supporting member and the casing structure may thus be rotated with a minimum of effort on the part of the operator.

In the present instance, the discharge passage 24 is formed in the supporting member 11 diametrically opposite the inlet passage 23 and communicates with the opening 20 in the member through a port 33. The port 33 is disposed substantially midway between the ports 31 and 32, so that when one of the measuring chambers is opened to the inlet ports, the other chamber will be opened to the outlet port. As shown in Fig. 1, for example, the passages 14 and 14ᵃ are positioned to register with the inlet ports 31 and 32, respectively, and the passage 15ᵃ is accordingly positioned to register with the outlet port 33. In this instance, the passage 15 is closed by a wall 34 forming a part of the supporting member which serves to divide the inlet passage 23 into its two branches.

It will be apparent that when the parts are positioned in the above manner, the material will flow under pressure through the passage 23, branches 29 and 30, ports 31 and 32 and passages 14 and 14ᵃ into the measuring chamber 6. The piston 8 is thus caused to move upwardly, as viewed in Fig. 1, by the pressure of the material entering the chamber. Due to the connection of the two pistons, piston 9 is also carried upwardly, and in this movement operates to expel the material previously introduced into the measuring chamber 7. This material is discharged through the passage 15ᵃ, the outlet port 33, outlet passage 24 and discharged into a delivery tube 35 from which it may be dispensed into sausage casings or other suitable containers. As herein shown, a pad 37 is provided on each piston to prevent the face of the piston from engaging the end wall of the chamber, thereby avoiding any possibility of the piston sticking to the wall.

When the piston 9 engages the end wall of the chamber 7, movement of the piston assembly is interrupted. Accordingly, no additional material can flow into the chamber 6 which thus receives a predetermined quantity of the material to be measured. At the same time, substantially all of the material previously introduced into the chamber 7 is expelled through the discharge passage. It should be noted that the chambers are emptied regardless of whether the device is adjusted to deliver portions of minimum or maximum size. Thus, at no time is there any accumulation of excess material in the chambers.

After the chamber 6 has been filled and the chamber 7 emptied in the manner above described, the positions of the chambers relative to the inlet and outlet ports of the supporting member may be reversed by rotating the casing structure through a quarter turn. For this purpose, the casing structure is provided with a manually operable handle 38 which, in the present instance, is removably connected to the casing section 12 by means of one or more screws 39. When the casing structure is so turned, the passages 15 and 15ᵃ are brought into registration with the ports 31 and 32 and the passage 14 registers with the outlet port 33. The plastic material is now forced into chamber 7 to fill the chamber, and the material previously introduced into chamber 6 is simultaneously expelled through the passage 14 and the outlet port 33 into the delivery tube.

It will be seen from the foregoing that the supporting member 11 and the casing section 12 together constitute a valve mechanism for controlling the flow of material into and out of the measuring chambers. With this construction, the length of the passages between the valve and the measuring chambers is reduced to a minimum so that substantially no excess material is present on the discharge side of the device. This greatly increases the accuracy of the device, as it avoids the piling up of relatively large quantities of the material which may be subject to variations when packed under pressure. The accuracy of the device is further increased by constructing the measuring chambers 6 and 7 of relatively small diameter. This requires that the pistons 8 and 9 move through a substantial distance in the filling and emptying of the chambers and permits the measuring capacity of the chambers to be regulated within extremely close limits.

To permit the capacity of the measuring chambers to be adjusted while the device is connected to the source of plastic material, I arrange the inlet and outlet ports and the various passages for the measuring chambers so as to permit one chamber to be cut off completely from the source of plastic material while the other chamber is in communication with the discharge passage. As will be seen by reference to Fig. 4, the ports 31 and 32 are relatively narrow as compared with the discharge port 33. Thus, when the casing structure is turned through slightly less than one-eighth of a turn, the passages in the casing section 12 are positioned, as shown in dotted line in Fig. 4. In this instance, the passages 14 and 14ᵃ are closed by the walls of the supporting member, while passage 15ᵃ is in communication with the outlet port 33. It is thus possible to turn the nut 18 and change the position of the piston 9 with a minimum of effort. If the capacity of the chambers is to be decreased, the nut is screwed up on the piston rod and the piston moves upwardly to discharge a small amount of material from the chamber 7. The piston 8 remains stationary at this time so that there is no change in the amount of material in the chamber 6 at this time. However, when delivery of material to chamber 6 is resumed, the adjustment previously made is effective to limit the amount of material received in the cylinder. Similarly, the capacity of the chambers may be increased by turning down the nut 18, in which case the piston 9 will move farther away from the piston 8 and thus increase the stroke of the pistons.

Due to the small number of parts, their simple construction, and the advantageous manner in which they are arranged for cooperation, the device may be disassembled easily for cleaning. The entire device may be disconnected from the sausage filling mechanism by simply unscrewing the union 26. Likewise, the casing structure may be disassembled from the supporting member by loosening the single nut 22. The parts when disassembled are readily accessible for cleaning, which is essential for devices designed to handle food products, such as sausage meat or the like.

It will be apparent from the foregoing that the invention provides a novel measuring device which is capable of measuring out predetermined quantities of plastic material with a high degree of accuracy. The device may be readily adjusted to deliver portions of material of any desired weight or size within the capacity of the machine. Such adjustment may be effected quickly and accurately by means of a common adjusting mechanism provided for this purpose, and when adjusted, the capacities of the two measuring chambers are always exactly equal. The plastic material is introduced into the measuring chambers in such a manner that the device may be actuated with a minimum of effort on the part of the operator even when the material is under relatively high pressure. Thus, the device may be operated at relatively high speed. Further, by reason of the simplified construction, the device may be manufactured economically and the parts may be disassembled very easily for cleaning or repair.

I claim as my invention:

1. A measuring device comprising, in combination, a supporting member having inlet and discharge passages, a casing structure having a pair of measuring chambers adapted to be moved relative to the support to open either chamber to said inlet passage while the other passage is open to the discharge passage, said passages being positioned to permit one chamber to be completely closed while the other chamber is open to said discharge passage.

2. A measuring device comprising, in combination, a supporting member having inlet and discharge passages, a casing structure having a pair of measuring chambers adapted to be moved relative to the support to open either chamber to said inlet passage while the other passage is open to the discharge passage, a piston in each of said chambers for determining the capacity of the same, a piston rod connecting said pistons for movement as a unit whereby the material is expelled from one chamber into said discharge passage in response to the filling of the other chamber by plastic material fed thereto under pressure through said inlet passages, said inlet and discharge passages being arranged so that either chamber may be closed to said inlet passage while the other chamber remains connected to the discharge passage to permit adjustment of said pistons to change the capacity of said chamber.

3. In a device for dispensing measured quantities of plastic material, in combination, a stationary supporting member having a cylindrical bore, inlet and outlet ports opening into said bore, a cylindrical casing supported in said bore for rotation about its axis, said casing forming a pair of axially alined measuring chambers for the plastic material, a piston in each chamber forming one wall of the chamber, a piston rod extending axially through the chamber and connecting said pistons together for movement as a unit so as to discharge the material from one chamber as an incident to the filling of the other chamber, passages communicating with each chamber, and means for rotating said casing about its axis to aline said passages alternately with the inlet and outlet ports so that while one chamber is receiving a charge of plastic material through the inlet port the material from the other chamber may be discharged through the outlet port.

4. In a device for dispensing measured quantities of plastic material, in combination, an elongated casing structure forming a pair of cylindrical measuring chambers, a stationary member for supporting said casing for rotation about its longitudinal axis, inlet and outlet passages in said supporting member, means for supplying plastic material under pressure to said inlet passage, means for rotating said casing about its axis to open said measuring chambers alternately to said passages, said passages being spaced apart so that one of the chambers communicates with the inlet passage while the other chamber communicates with the outlet passage, and means operated in response to the flow of material into said one measuring chamber for expelling a measured quantity of the material from the other chamber through said discharge passage, said last means comprising a piston disposed in each cylinder and a piston rod extending axially through said measuring chambers and operatively connecting the pistons.

5. In a device for dispensing measured quantities of plastic material, in combination, a cylindrical casing forming a pair of axially alined measuring chambers for the plastic material, a piston in each chamber forming one wall of the chamber, a piston rod extending axially through said chambers and operatively connecting said pistons for movement as a unit whereby material may be forced out of one chamber incident to the filling of the other chamber, and a single adjusting means for simultaneously adjusting the capacity of both chambers, said adjusting means consisting of means for shifting one of the pistons longitudinally of the piston rod.

6. In a device for dispensing measured quantities of plastic material, in combination, a pair of cylindrical measuring chambers, means for forcing the plastic material into said chambers alternately to fill the same, a piston disposed in each chamber, means operatively connecting said pistons for movement as a unit whereby one chamber is emptied incident to the filling of the other chamber, said connecting means comprising a rod extending axially through said chambers and said pistons, means rigidly connecting one end of said rod to one of the pistons, a nut threaded onto the other end of said rod operable to vary the position of the other piston relative to the rod for adjusting the capacity of the measuring chambers, and a spacing sleeve interposed between said nut and said piston acting to space the threaded portion of the rod substantially from the piston and prevent contact with the material being measured when the chambers are adjusted to their maximum capacity.

7. In a device for dispensing measured quantities of plastic material, in combination, a stationary supporting member having a cylindrical bore, plastic material inlet ports opening into opposite sides of said bore, an outlet port opening into said bore between said inlet ports, a cylindrical casing supported in said bore for rotation about its axis, said casing forming a measuring chamber for the plastic material, a pair of passages in said casing communicating with said measuring chamber and adapted to be brought into registration alternately with said inlet and outlet ports by rotating movement of the casing, said passages being spaced apart so as to register with both inlet ports at the same time to admit plastic material into opposite sides of the measuring chamber simultaneously and thereby maintain the casing evenly balanced with respect to the supporting member whereby to facilitate movement of the casing.

8. In a device for dispensing plastic material in measured quantities, in combination, a stationary supporting member having a cylindrical bore, plastic material inlet ports opening into opposite sides of said bore, an outlet port opening into said bore between said inlet ports, a cylindrical casing supported in said bore for rotation about its axis, said casing defining a pair of axially alined measuring chambers for the plastic material, four passages in said casing, two of said passages communicating with one measuring chamber and adapted to be brought into registration with said inlet ports while one of the other two passages which communicate with the other measuring chamber is brought into registration with said outlet port by rotating movement of the casing, the passages of each pair being spaced apart so as to register with both inlet ports at the same time to admit plastic material into opposite sides of the measuring chamber simultaneously and thereby maintain the casing in a balanced condition so that it can be easily rotated relative to the supporting member.

ERNEST T. WAHLBOM.